UNITED STATES PATENT OFFICE.

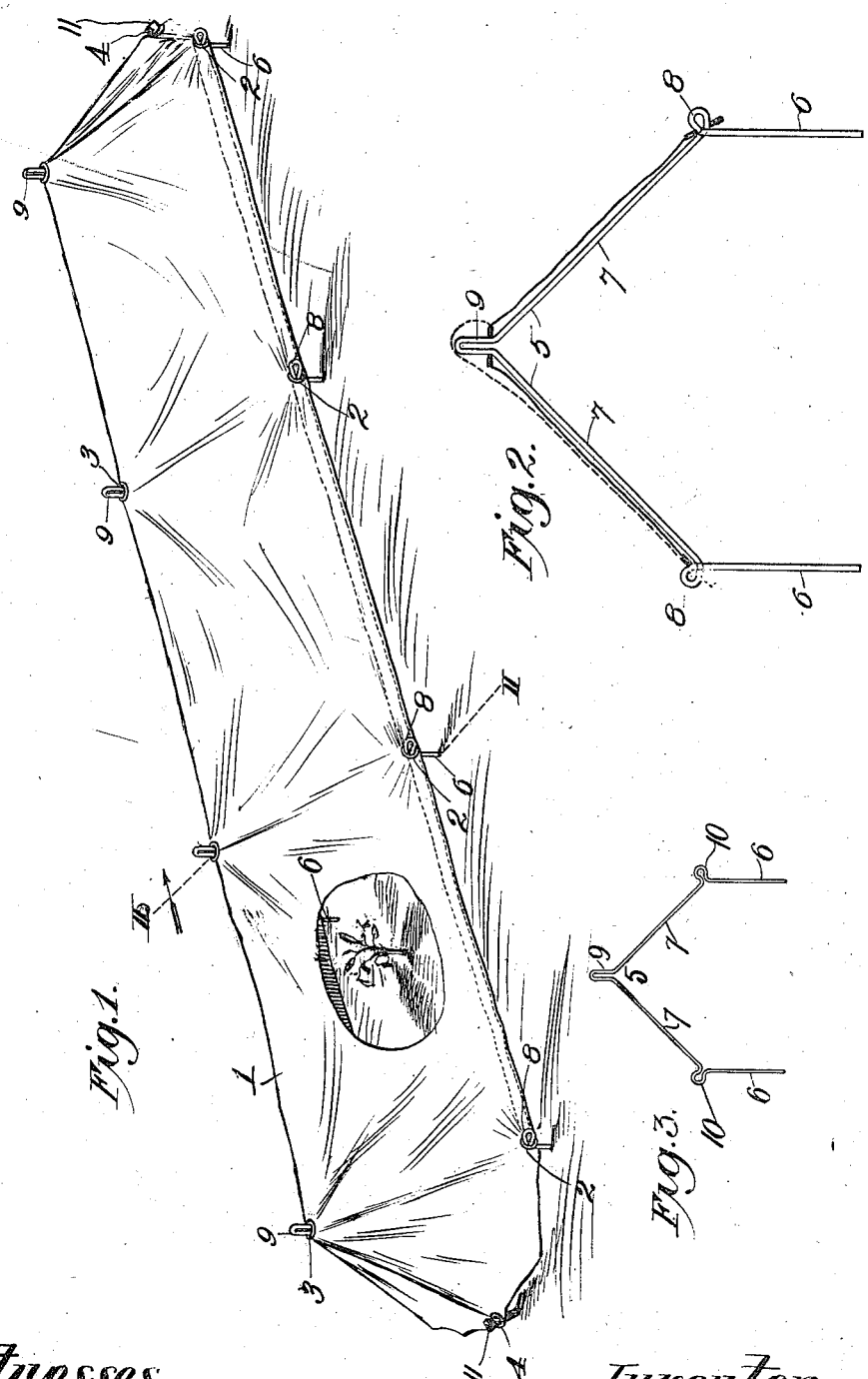

GEORGE T. WELLS, OF WICHITA, KANSAS.

PLANT-PROTECTOR.

963,099.

Specification of Letters Patent. Patented July 5, 1910.

Application filed June 16, 1909. Serial No. 502,627.

*To all whom it may concern:*

Be it known that I, GEORGE T. WELLS, a citizen of the United States, residing at Wichita, in the county of Sedgwick and State of Kansas, have invented certain new and useful Improvements in Plant-Protectors, of which the following is a specification.

This invention relates to plant protectors, and more especially to a device for protecting young plants from the sun in the heat of the day and from frost at night, and my object is to produce a protector which will perform its function efficiently and reliably in windy as well as calm weather and which is susceptible of being adjusted to expose the plants fully to the air at one side while protecting them at the other.

A further object is to produce a protector which can be collapsed or folded into a small and compact package for convenience of storage and in securing it in or withdrawing it from position.

A still further object is to produce a protector of simple, strong, durable and cheap construction.

With these objects in view, and others as hereinafter appear, the invention consists in certain novel and peculiar features of construction and organization as hereinafter described and claimed; and in order that it may be fully understood reference is to be had to the accompanying drawing, in which;

Figure 1, is a perspective view of a protector embodying my invention, arranged in operative position and broken away to expose a protected plant. Fig. 2, is an enlarged cross section on the line II—II of Fig. 1. Fig. 3, is a detail view of a modified form of one of the frames forming a part of the protector.

In the said drawing, 1 indicates a strip of canvas, duck or other fabric, waterproof or not as required, adapted when in operative position to be arranged in the form of a long tent V-shaped in cross section and provided at suitable intervals near its margins with eyelets 2, preferably of metal, and along its center or ridge line with eyelets 3 preferably of metal, each eyelet 3 being transversely alined with a pair of eyelets 2. It is also provided at the extremities of its longitudinal center with similar eyelets 4 so that the end portions of the fabric may form end walls of the protector.

The frames 5 are of arch form, being preferably made of stiff wire bent to form substantially parallel side portions, or anchors 6 and upwardly-converging top portions 7. The lower ends of the portions 6 and 7 are connected by external loops 8, the wire being preferably crossed to form such loops, so as to stiffen the frame at such points. The upper ends of portions 7 are connected by upwardly-projecting loops 9. In Fig. 3 which is the cheaper and probably weaker type of frame, the loops 10, at the junction of the portions 6 and 7 are open as distinguished from the closed loops 8 of Figs. 1 and 2, though the latter show as closed loops clearly only in the last-named figure.

The fabric or tent portion of the protector is secured to the frames by slipping the eyelets 3 over loops 9 and the eyelets 2— in transverse alinement with the eyelets 3 engaging loops 9,—over the loops 8 or 10 as the case may be, of the corresponding frames. By this arrangement it will be seen that the fabric in the planes of said frames, is stretched to inverted V-shaped form. When not in use the intervening portions or stretches of the fabric can be collapsed or folded so that the frames can be brought closely together side by side, and in this condition a protector of great length can be grasped and held easily in one hand.

Assuming that it is desired to secure the protector over a row of plants, the operator starting at one end of the row, forces the portions or anchors 6 of the first frame down into the ground at opposite sides of the first plant. He then unfolds or pays out the fabric to the second frame and anchors that to the ground in the same manner, repeating the operations described until the opposite end of the protector is reached. The end portions of the protector hang down adjacent to the endmost frames, but if desired, these end portions can be stretched downward and outward to form end walls and pegs or anchors 11 forced into the ground through the eyelets 4 to secure such end walls in place. To permit air to circulate around the plants the frames are secured to the ground so as to leave an air-space between the same and the side edges or margins of the protector, as shown clearly. If it is desired to give the plants more air and light, one side of the fabric portion of the protector may be partly or wholly disengaged from the corresponding loops 8 or 10 as the case may be and folded back over the other side as will be readily understood and as indicated by dotted lines in Fig. 2. To remove the protector, the operator disengages it from the peg 11 at one end, if so secured, and pulls up the adjacent end frame and collapses or gathers up the stretch of fabric between said frame and the second frame. He then pulls the second frame from the ground, and repeats the operations described until all of the frames have been withdrawn from the ground and the intermediate portions or stretches of the fabric are in folded or collapsed condition. The protector may then be laid away for future service. If desired the fabric portion of the protector may be of waterproof material or made waterproof by oiling or otherwise.

From the above description it will be apparent that I have produced a plant protector embodying the features of advantage enumerated in the statement of the object of the invention, which is susceptible of modification in minor particulars without departing from the spirit and scope or sacrificing any of the advantages of the appended claims.

Having thus described the invention what I claim as new and desire to secure by Letters-Patent, is;

1. A plant protector, comprising a plurality of frames to be forced down into the ground and embodying arched upper portions, and a strip of fabric fitting over said frames and detachably connected at points in its longitudinal center to the central portions of said frames and along and near its side margins to said frames adjacent to the ground.

2. A plant protector, comprising a plurality of frames to be forced down into the ground and embodying arched upper portions equipped with loops at their highest points and with loops at opposite sides of and below the horizontal plane of said first-named loops, and a strip of fabric fitted over said frame and provided with a longitudinal series of eyelets to engage the first-named loops of the frames and with series of eyelets near its side margins to engage the loops of the frames at opposite sides of the first-named loops.

3. A plant protector, comprising a plurality of frames to be forced down into the ground and embodying arched upper portions equipped with loops at their highest points and with loops at opposite sides of and below the horizontal plane of said first-named loops, a strip of fabric fitted over said frame and provided with a longitudinal series of eyelets to engage the first-named loops of the frames and with series of eyelets near its side margins to engage the loops of the frames at opposite sides of the first-named loops, and means for securing the ends of the fabric to the ground at a point between and beyond the endmost frames to provide end walls for the protector.

4. In a device of the character described, a frame made from a single piece of wire, comprising an arched upper portion consisting of upwardly-converging portions, portions extending downward from the lower ends of said converging portions, loops formed at the junction of said converging and downwardly-extending portions and extending upwardly and outwardly, and loops formed at the junction of the upper ends of the upwardly-converging portions; said last named loops being of inverted U-form.

In testimony whereof I affix my signature, in the presence of two witnesses.

GEORGE T. WELLS.

Witnesses:
HELEN C. RODGERS,
G. Y. THORPE.